United States Patent
Choi et al.

(10) Patent No.: US 8,745,445 B1
(45) Date of Patent: Jun. 3, 2014

(54) MIRRORED DATABASE UPGRADE USING STATE MACHINE

(75) Inventors: King Lun Choi, Palo Alto, CA (US);
Jeffrey Ira Cohen, Sunnyvale, CA (US);
Caleb E. Welton, Foster City, CA (US);
Kenneth A. Sell, Sunnyvale, CA (US);
Milena Bergant, San Mateo, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 288 days.

(21) Appl. No.: 13/371,342

(22) Filed: Feb. 10, 2012

(51) Int. Cl.
*G06F 11/00* (2006.01)

(52) U.S. Cl.
USPC .............................................. 714/16; 714/15

(58) Field of Classification Search
CPC .......................... G06F 11/1471; G06F 11/1474
USPC ...................................................... 714/15, 16
See application file for complete search history.

(56) References Cited

U.S. PATENT DOCUMENTS

| | | | |
|---|---|---|---|
| 7,174,479 B2 * | 2/2007 | Kutan et al. | 714/15 |
| 7,840,674 B1 * | 11/2010 | Sterling | 709/226 |
| 2004/0117453 A1 * | 6/2004 | Cheng et al. | 709/212 |
| 2012/0117423 A1 * | 5/2012 | Andrade et al. | 714/16 |
| 2012/0311377 A1 * | 12/2012 | Blood et al. | 714/4.12 |

* cited by examiner

*Primary Examiner* — Philip Guyton
(74) *Attorney, Agent, or Firm* — Fish & Richardson P.C.

(57) ABSTRACT

A process for upgrading a mirrored shared-nothing database system comprises a sequence of short well-defined idempotent steps, and at least one non-idempotent step involving transforming a master catalog. The upgrade process is managed and controlled by a state machine that has a persistent memory running on the master node. In the event of a failure or crash during an idempotent step, the process stops the database in the current state and repeats the step. If a failure or crash occurs during a non-idempotent step, the upgrade process is rolled back to the beginning and repeated.

14 Claims, 3 Drawing Sheets

MIRRORED DATABASE UPGRADE USING STATE MACHINE

BACKGROUND

This invention relates generally to mirrored databases, and more particularly to controlling and monitoring a database upgrade process to permit resuming the upgrade process from a consistent state in the event of an error.

Large scalable databases systems that mirror data for redundancy and fault tolerance are used by enterprises for storing important data. Databases use a self-describing catalog comprising a persistent metadata store that describes the state of the system and its contents. The catalog is essential to all operational processes, such as starting up the database, creating tables, or planning and executing queries. When new database objects are created, or when a new version of the database is developed, the catalog may change. The catalog will have new tables or columns, which describe the new objects. Also, the representations of existing objects may change in the new release. In these situations, the old representations must be transformed into the new form. The process of converting or transforming an existing catalog to a newer version is referred to as a "database upgrade".

Upgrading a mirrored database is an involved process that is subject to a number of possible errors that can leave the database in an inconsistent or unusable state. If the upgrade process fails or is interrupted, it can leave the database non-operational. Therefore, the process must be able to undo any catalog changes and revert ("rollback") to the original state, or otherwise resume where it left off and continue the upgrade process to its finish.

Thus, it is important to maintain accurate information as to the status of the process and state of the database at various stages of the upgrade process, and that the upgrade process is capable of being reversed. Making the upgrade process robust enough so that it can survive a crash or a failure and move forward or rollback to a consistent state is complex. It is desirable to provide upgrade processes that are capable of this, and that addresses the foregoing and other problems of known upgrade processes. It is to these ends that the present invention is directed.

DESCRIPTION OF PREFERRED EMBODIMENTS

The invention may be employed with different types of mirrored database architectures. It is particularly applicable to a shared-nothing database architecture, and will be described in that context. However, as will be appreciated, this is illustrative of only one utility of the invention.

Figure 1:
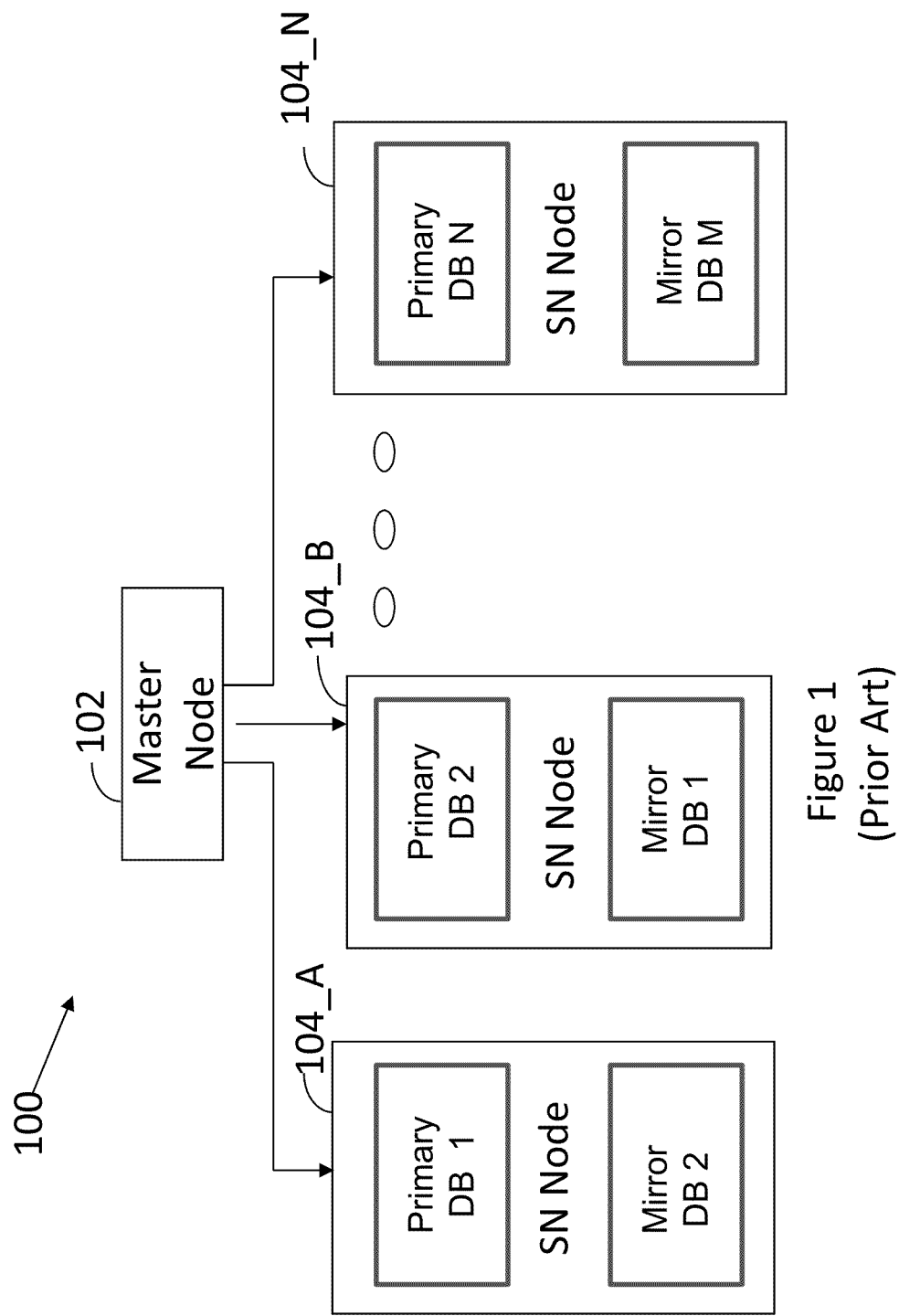
FIG. 1 illustrates the architecture one type of a mirrored database system with which the invention may be employed.

FIG. 1 illustrates a shared-nothing network architecture of a large, scalable logical distributed database system 100 of an enterprise with which the invention may be employed. In an embodiment the database system may be an SQL database based on Postgres. The database may include a master node 102 which connects to a plurality of shared-nothing nodes 104-A through 104-N. Each shared-nothing node may comprise a plurality of database (DB) segments (database instances) including one or more primary databases and one or more mirror databases. As indicated in the figure, for fault tolerance purposes, a primary database segment and its corresponding mirror database segment are usually located on different nodes. Node 104-A may contain, for example, Primary DB 1 and Mirror DB 2, whereas node 104-B may contain Primary DB 2 and Mirror DB 1. Thus, mirroring Primary DB 1 on node 104-A requires that primary user data and catalog be written (replicated) to Mirror DB 1 on node 104-B. The master and segment nodes may be server applications having the same process model as a standalone server and augmented with extensions for a distributed system, such as data distribution, remote process communications, and data replication between primary-mirror pairs.

Figure 2:
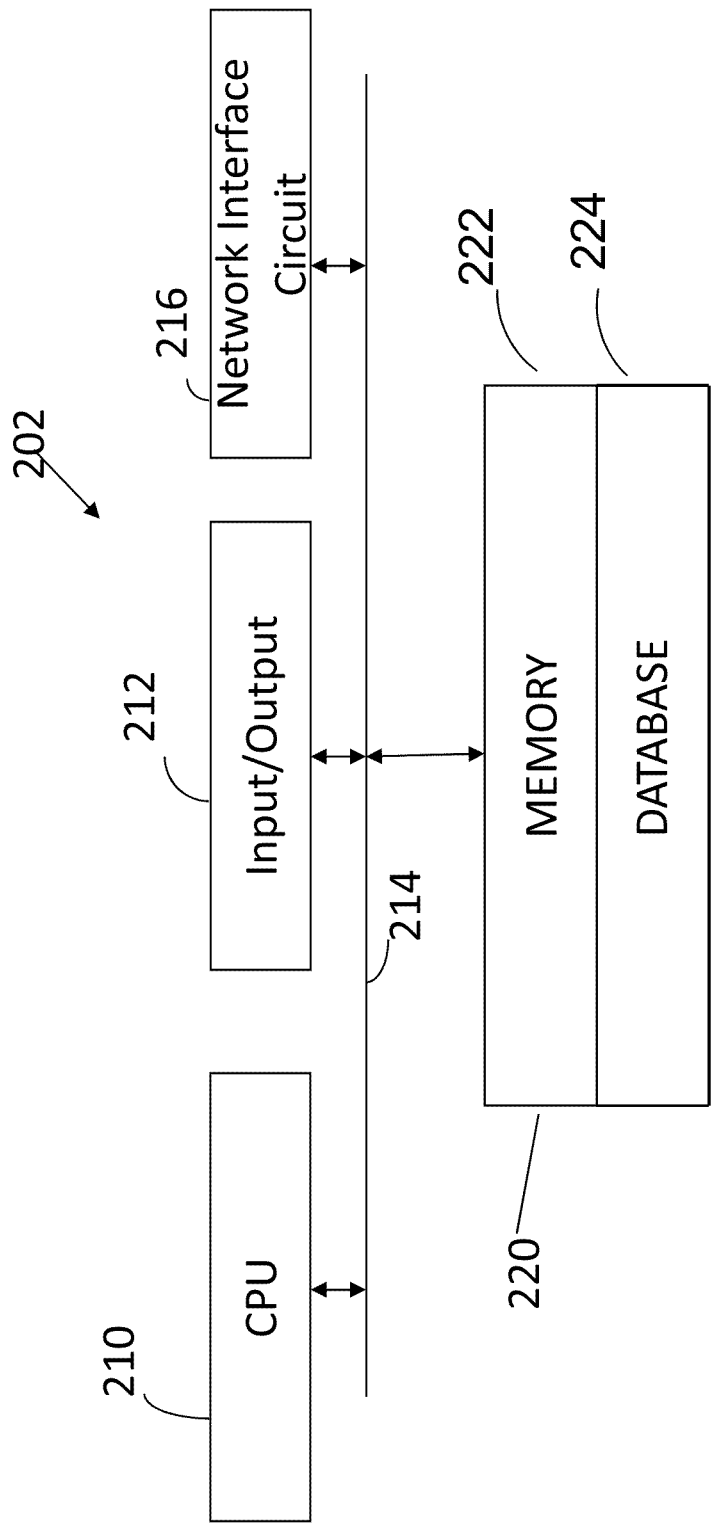
FIG. 2 is a block diagram illustrating a note of the database system of FIG. 1.

FIG. 2 illustrates an embodiment of a master node 202 of the shared-nothing database that is configured to perform processes and operations in accordance with the invention. The master node 202 may comprise a host computer server system 210 (which may comprise a single CPU or may be a multi-processor system comprising a plurality of CPUs) connected to input/output (I/O) devices 212 by a bus 214. The I/O devices may be standard computer system input and output devices. A network interface circuit 216 may also be connected to bus 214 to allow the master node to operate in the networked environment of the database of FIG. 1. The master node may further have a storage 220 comprising non-transitory physical storage media connected to the bus that embodies executable instructions to control the operations of the computer system. Storage 220 may include a main memory 222 comprising instructions that control the CPU to operate in accordance with the invention, as will be described, and may contain a database 224, including a master database catalog. The catalog in a database, as stated above, stores persistent metadata that describes the state of the system and its contents. The catalog may have tables or columns of metadata that describes database objects. The shared-nothing nodes may have an architecture similar to that of the master node.

As will be described, in an embodiment, the invention affords an upgrade process that comprises a sequence of small well-defined steps. The starting state of the process is the initial old database, and the final state of the process is either an upgraded database or a rolled back upgrade process which is rolled back to the initial database state. The invention also provides a state machine to monitor and control the upgrade process, and to resume or rollback and restart the process in the event of a failure. The state machine may run on the master node, and may comprise executable instructions stored in memory 222 for controlling the CPU 210.

In an embodiment, each step of the upgrade process has three possible outcomes, i.e., success, failure, or a crash. Depending upon the outcome, the state machine may cause the upgrade process to move to the next stage. In the event of a crash, however, the state remains unchanged.

All of the steps of the upgrade process, except possibly one, are preferably idempotent, meaning that they are repeatable and will produce the same result each time they are repeated. For all of the idempotent steps, if a failure or a crash occurs during the step, the upgrade will stop at its current state. Once the error that caused the failure or crash has been corrected, the upgrade process can continue from the beginning of the step in which it failed. For the non-idempotent step, however, if there is a detected failure during the step, the database will have to be rolled back to its initial non-upgraded starting state. For instance, if the failure occurs in the middle of transforming the catalog, the process cannot simply leave the catalog in the middle of a partially transformed state. It must be rolled all the way back to its initial state, and the process restarted. If a crash occurs during an action, the user can re-execute the action, just like other crashes. However, re-executing the step from a crash could likely produce a failure which will cause the database to revert back to its initial non-upgraded state and require that the upgrade process be restarted at the beginning.

Figure 3:
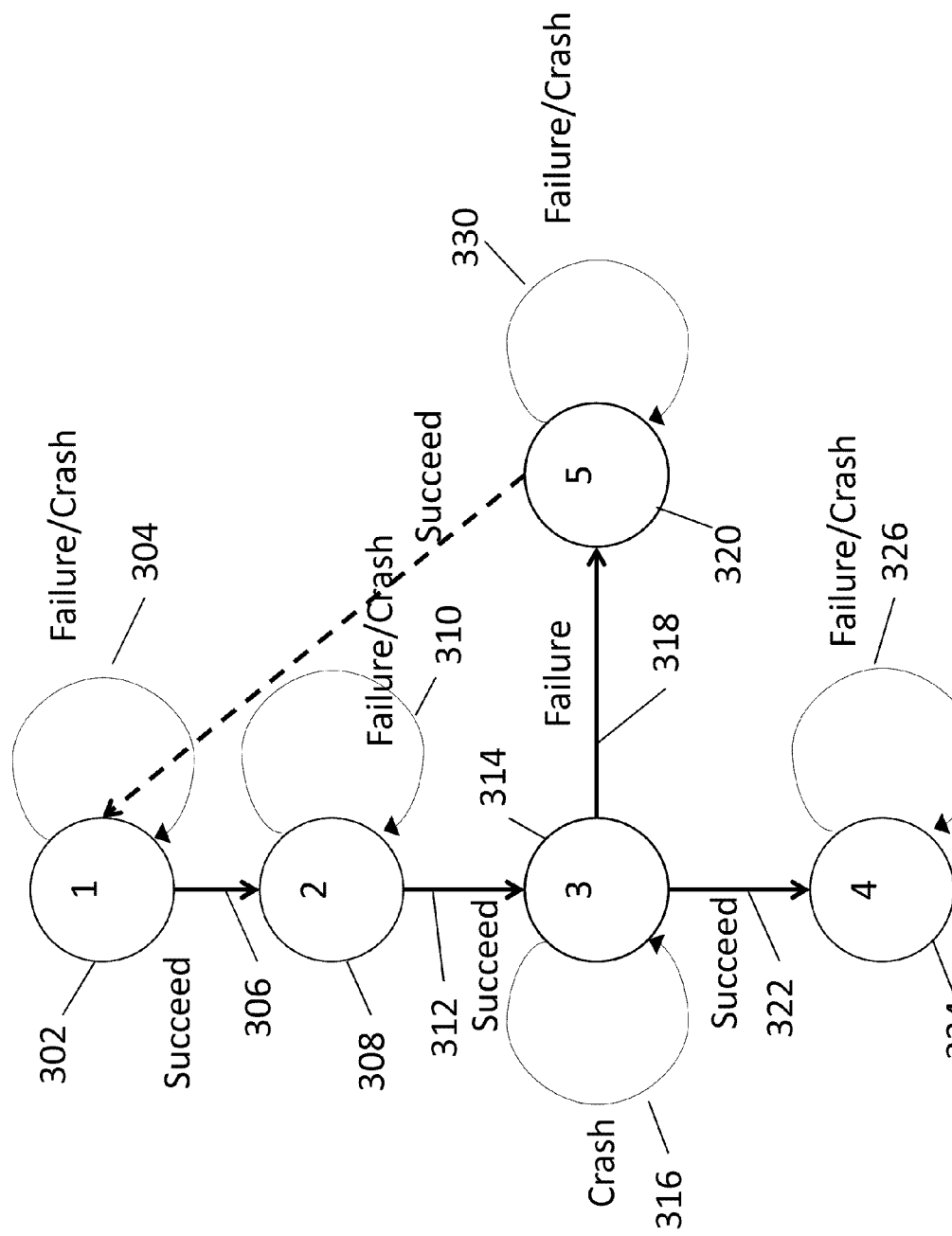
FIG. 3 is a state transition diagram illustrating an upgrade process in accordance with an embodiment of the invention.

FIG. 3 is a state transition diagram that illustrates an upgrade process in accordance with a preferred embodiment of the invention. Since the upgrade process involves changes to the catalog that are not part of a transaction, the database is in an inconsistent state during the upgrade process and cannot be simply restarted in the event of a failure. To address this, as noted above, the upgrade process is preferably managed and controlled by a state machine running on the master node. The state machine comprises an independent layer on top of the database that has persistent memory so that it always knows the current state of the process and the database, and controls the upgrade so that it can roll back the process to the beginning or repeats steps, as needed. A loss of state cannot be tolerated. The state machine avoids this through its persistent memory which permits keeping track of each state.

In the embodiment of the invention illustrated in FIG. 3, the upgrade process comprises five principal steps. Beginning at step 1 (302), the process checks the health of the database to ensure that it is up and running. If at 304 the database has failed, the process will alert the user and stop the upgrade. If the database has crashed, the upgrade process will remain in its current state to allow the user to reboot and rerun step 1. If step 1 succeeds (306), the process goes on to step 2 (308).

In step 2, the process turns off a mirror database and preserves its state so that it may be used as a backup in the event of a failure. If, however, at 310 the mirror of turning off the mirror has failed, an alert will be provided to the user and the process will remain in its current state. If, instead, the database has crashed during the action of turning off the mirror, the process will remain in the current state and the user can reboot and rerun the step. If step 2 succeeds, the process may then proceed to step 3 (314). Steps 1 and 2 are idempotent steps. In the event of an error, the error can be corrected and the steps can repeated.

In step 3 (314) of the upgrade process, the database catalog is transformed by running SQL scripts. Once the catalog has been successfully transformed, the transformed catalog may be replicated on all of the primary segments, and then propagated to the mirror segments. Step 3 is a non-idempotent step. If a crash (316) occurs in the middle of transforming the catalog, it will leave the catalog in an indeterminate state. In this case, the user will have to reboot and rerun the process. If a failure occurs (318), the process proceeds to step 5, 320. If step 3 succeeds (322), the process proceeds to step 4, 324.

In step 4, 324, the transformed catalog is propagated to the mirror segments. If this step succeeds, the upgrade has been completed successfully. If this step fails (326), the user can be alerted and the process will remain in its current state. If a crash occurs, the process will remain in the current state and the user may reboot and rerun the process.

If a failure (318) occurs in step 3, in step 5, 320, the primary database may be recovered by using a mirror. If step 5 fails or a crash occurs, 330, the user will be alerted and the process will remain in the current state. If a crash occurs, the user may reboot and repeat step 5, and attempt to recover the primary from the mirror. If step 5 succeeds, 340, the process may be aborted and return to step 1.

As will be appreciated from the foregoing, the invention affords an upgrade process is capable of handling a large class of errors while still retaining the ability to return to a usable state, thereby permitting successful database upgrades. Moreover, the upgrade process of the invention reduces complexity so that a user only needs to issue an upgrade command upon the occurrence of a crash or a failure during the upgrade process, and the state machine will automatically handle either a continuation or a rollback of the process, as needed.

While the foregoing description has been with reference to particular embodiments of the invention, it will be appreciated by those skilled in the art that modifications to these embodiments may be made without departing from the principles and spirit the invention, the scope of which is defined by the appended claims.

The invention claimed is:

1. A method for upgrading a mirrored database, comprising:
   running an upgrade process comprising a sequence of well-defined idempotent steps and a non-idempotent step on the database, each step having as possible outcomes a success, a failure, or a crash;
   monitoring the status of the upgrade process and the database state using a state machine having a persistent memory;
   upon an error occurring during one of said idempotent steps of the upgrade process, stopping the upgrade process in a current state of the database and repeating said one idempotent step; and
   upon an error occurring during said non-idempotent step, rolling back said upgrade process to a beginning and repeating the upgrade process.

2. The method of claim 1, wherein said mirrored database comprises a master node and a plurality of segment nodes, said segment nodes having one or more pairs of primary and mirror databases, and wherein said state machine is run on said master node.

3. The method of claim 2, wherein said non-idempotent step comprises transforming a catalog on said master node.

4. The method of claim 3 further comprising aborting said upgrade process upon the occurrence of a failure.

5. The method of claim 3, wherein said upgrade process comprises propagating said transformed catalog to said primary and mirror databases.

6. The method of claim 2, wherein said upgrade process comprises turning off and preserving a mirror database as a backup for failure of a primary database.

7. The method of claim 5, wherein said upgrade process further comprises recovering the primary database from said mirror database in the event of a failure.

8. Computer readable non-transitory storage medium for storing instructions for controlling the operation of a computer for upgrade of a mirrored database system, comprising instructions for:
   running an upgrade process comprising a sequence of well-defined idempotent steps and a non-idempotent step on the database, each step having as possible outcomes a success, a failure, or a crash;
   monitoring the status of the upgrade process and the database state using a state machine having a persistent memory;
   upon an error occurring during one of said idempotent steps of the upgrade process, stopping the upgrade process in a current state of the database and repeating said one idempotent step; and
   upon an error occurring during said non-idempotent step, rolling back said upgrade process to a beginning and repeating the upgrade process.

9. The computer readable medium of claim 8, wherein said mirrored database comprises a master node and a plurality of segment nodes, said segment nodes having one or more pairs of primary and mirror databases, and wherein said state machine is run on said master node.

10. The computer readable medium of claim 9, wherein said non-idempotent step comprises instructions for transforming a catalog on said master node.

11. The computer readable medium of claim 10 further comprising instructions for aborting said upgrade process upon the occurrence of a failure.

12. The computer readable medium of claim 10, wherein said instructions comprise instructions for propagating said transformed catalog to said primary and mirror databases.

13. The computer readable medium of claim 9, wherein said instructions comprise instructions for turning off and preserving a mirror database as a backup for failure of a primary database.

14. The computer readable medium of claim 13, wherein said instructions further comprise instructions for recovering the primary database from said mirror database in the event of a failure.

\* \* \* \* \*